US006991583B2

(12) United States Patent
Saitou et al.

(10) Patent No.: US 6,991,583 B2
(45) Date of Patent: Jan. 31, 2006

(54) SYSTEM FOR CONTROLLING TORQUE REDUCTION AT SHIFTING FOR AUTOMATIC TRANSMISSION

(75) Inventors: Yuuji Saitou, Shizuoka (JP); Kenichi Ooshima, Shizuoka (JP); Ikuo Hirose, Shizuoka (JP); Masato Tanaka, Shizuoka (JP)

(73) Assignee: Jatco LTD, Fuji (JP)

( * ) Notice: Subject to any disclaimer, the term of this patent is extended or adjusted under 35 U.S.C. 154(b) by 112 days.

(21) Appl. No.: 10/489,957

(22) PCT Filed: Sep. 27, 2002

(86) PCT No.: PCT/JP02/10061

§ 371 (c)(1),
(2), (4) Date: Mar. 18, 2004

(87) PCT Pub. No.: WO03/029697

PCT Pub. Date: Apr. 10, 2003

(65) Prior Publication Data

US 2004/0235617 A1    Nov. 25, 2004

(30) Foreign Application Priority Data

Sep. 28, 2001  (JP)  ............................. 2001-302942

(51) Int. Cl.
*B60K 41/04* (2006.01)
(52) U.S. Cl. ..................................................... 477/109
(58) Field of Classification Search ............... 477/101, 477/102, 103, 104, 105, 106, 107, 109, 111
See application file for complete search history.

(56) References Cited

U.S. PATENT DOCUMENTS

| 4,680,988 A | | 7/1987 | Mori |
| 5,119,696 A | * | 6/1992 | Yamaguchi ................. 477/109 |
| 5,562,567 A | * | 10/1996 | Koenig et al. ................ 477/54 |
| 5,816,976 A | | 10/1998 | Kuroiwa et al. |

FOREIGN PATENT DOCUMENTS

| JP | 63-53388 B2 | 10/1988 |
| JP | 10-47469 A | 2/1998 |
| JP | 10-89112 A | 4/1998 |
| JP | 10-184410 A | 7/1998 |

OTHER PUBLICATIONS

U.S. Appl. No. 10/489,959, filed Mar. 18, 2004, Saitou et al.
U.S. Appl. No. 10/490,161, filed Mar. 18, 2004, Inuta.
U.S. Appl. No. 10/489,958, filed Mar. 18, 2004, Saitou.

* cited by examiner

*Primary Examiner*—Dirk Wright
(74) *Attorney, Agent, or Firm*—Foley & Lardner LLP

(57) ABSTRACT

A system for controlling a torque reduction at shifting for an automatic transmission is provided with actual gear-ratio detecting means for detecting an actual gear ratio out of input rotation and output rotation of the automatic transmission, and torque-reduction amount computing means for calculating a torque-reduction amount out of a torque-reduction set gain set previously, which is a rate of change of the torque-reduction amount with respect to a change in gear ratio, and the detected actual gear ratio. With this, the start and completion timings of torque-reduction control can be optimized to prevent elongation of shifting. This results in enhancement in the shift quality and in the endurance reliability of a friction material for shifting.

7 Claims, 7 Drawing Sheets

SYSTEM FOR CONTROLLING TORQUE REDUCTION AT SHIFTING FOR AUTOMATIC TRANSMISSION

TECHNICAL FIELD

The present invention relates to a system for controlling a torque reduction at shifting for an automatic transmission, and more particularly, to torque-reduction control for enhancing the shift quality at upshifting.

BACKGROUND ART

Conventionally, in the art described, for example, in the publication of JP-A 10-47469, torque-reduction control is carried out to enhance the shift quality of the automatic transmission mounted on the vehicle and the endurance reliability of a friction material for shifting.

This torque-reduction control is designed such that torque for producing a speed change is increased by a reduced portion of engine torque to allow completion of shifting in a short time. Moreover, a load is decreased by a shortened portion of a shift time to allow enhancement in the endurance reliability.

Figure 10:
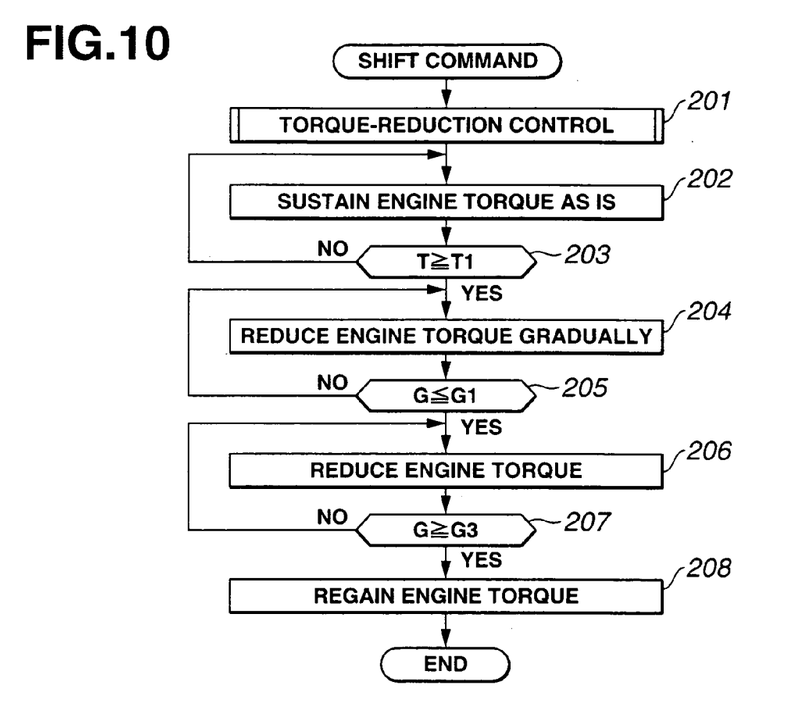
FIG. 10 is a flow chart illustrating torque-reduction control in the comparative example.
Figure 11:
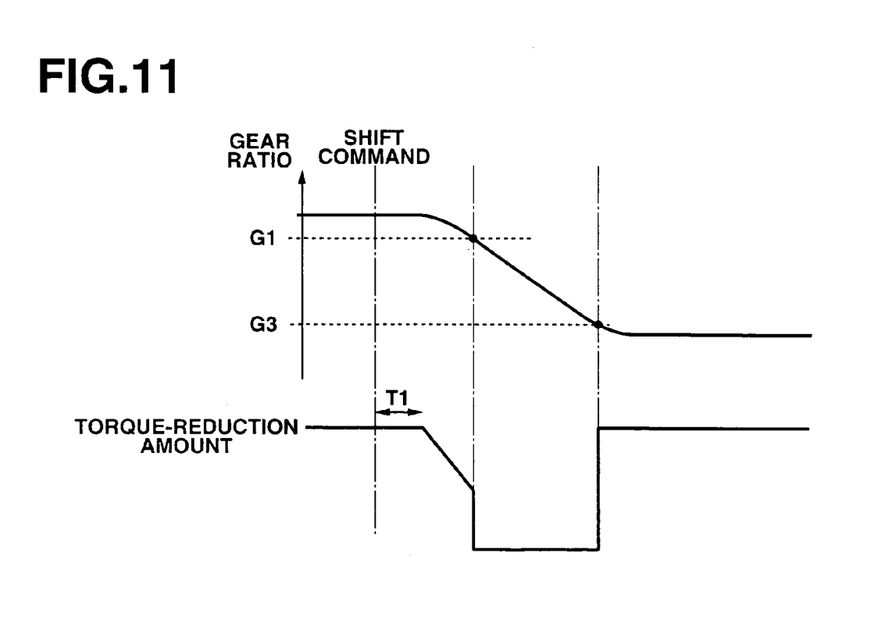
FIG. 11 is a time chart of a gear ratio and a torque-reduction amount during torque-reduction control in the comparative example.

This is carried out, for example, as shown in a flowchart in FIG. 10 for illustrating torque-reduction control and a time chart of a gear ratio and a torque-reduction amount in FIG. 11. Specifically, after a lapse of a predetermined time T1 from output of a shift command, engine torque is reduced gradually. And when an actual gear ratio becomes smaller than a third set gear ratio G3, engine torque is regained at a stroke to allow shortening of a shift time.

In the above-mentioned prior art, however, torque is sustained during the predetermined time T1, then reduced gradually. Thus, if a torque reduction is started with the actual gear ratio not changed, acceleration is too reduced by a portion of torque reduction, leading to a problem of occurrence of a torque falloff feel. On the other hand, torque is sustained during the predetermined time T1, so that if a start timing of torque reduction is too delayed, progression of the inertia phase is delayed, leading to a problem of elongation of shifting.

Moreover, at completion of torque-reduction control, torque is regained at a stroke when the third set gear ratio G3 is established. However, if a torque reduction is completed before completion of the inertia phase, progression of the inertia phase is delayed, leading to a problem of elongation of shifting (a shift time is elongated) or impossible completion of the inertial phase due to turning-back of shifting.

DISCLOSURE OF THE INVENTION

The present invention is made in view of the above-mentioned problems of the prior art, and aims to provide a system for controlling a torque reduction at shifting for an automatic transmission wherein start and completion timings of torque reduction are controlled to prevent elongation of shifting, thus allowing enhancement in the shift quality and in the endurance reliability of a friction material for shifting.

The invention as described in claim 1 is directed to a system for controlling a torque reduction at shifting for an automatic transmission, the system comprising: torque changing means for changing an output torque of a prime mover; shift-state detecting means for detecting a shift state of the automatic transmission shift-controlled by shift control means in accordance with running conditions including a driving state; and torque-reduction control means for reducing, when detecting start of an upshifting by said shift-state detecting means, the output torque by said torque changing means during a period from this detection to completion of the upshifting, characterized in that there arrange actual gear-ratio detecting means for detecting an actual gear ratio out of input rotation and output rotation of the automatic transmission, and torque-reduction amount computing means for calculating a gain of a torque-reduction amount based on the detected actual gear ratio.

With this system for controlling a torque reduction at shifting for an automatic transmission, an actual gear ratio is detected by the actual gear-ratio detecting means out of input rotation and output rotation of the automatic transmission, and a torque-reduction amount is calculated in the torque-reduction amount computing means out of the detected actual gear ratio and a torque-reduction amount set gain. Therefore, even if a gradient of change of an actual gear ratio varies, a torque-reduction amount follows a change in the actual gear ratio, so that a torque-reduction amount can be set appropriately, resulting in appropriate control of the start and completion timings of torque-reduction control. With this, stable torque-reduction control is possible to prevent elongation of shifting, allowing enhancement in the shift quality and in the endurance reliability of a friction material for shifting.

The invention as described in claim 2 is directed to the system for controlling a torque reduction at shifting for an automatic transmission as specified in claim 1, characterized in that said torque-reduction amount computing means include means having a plurality of set gear ratios and for changing the torque-reduction amount set gain by the detected actual gear ratio reaches the set gear ratio.

With this system for controlling a torque reduction at shifting for an automatic transmission, the torque-reduction amount set gain is changed, so that more stable torque-reduction control is possible to achieve further prevention of a shock and the like due to torque reduction.

The invention as described in clam 3 is directed to the system for controlling a torque reduction at shifting for an automatic transmission as specified in claim 1 or 2, characterized in that said torque-reduction amount computing means include means having a plurality of set gear ratios immediately after start of shifting and for changing an absolute value of said torque-reduction amount set gain to be greater as shifting progresses and putting said torque-reduction amount set gain to zero when said actual gear ratio reaches the set gear ratio of zero gain to maintain the torque-reduction amount constant.

With this system for controlling a torque reduction at shifting for an automatic transmission, it is possible not only to start torque-reduction control smoothly, but also to secure a torque-reduction amount quickly due to an absolute value of the torque-reduction amount set gain being greater. Thus, from start of shifting, shifting passes smoothly into the inertia phase where a change in gear ratio occurs, then progresses quickly.

The invention as described in claim 4 is directed to the system for controlling a torque reduction at shifting for an automatic transmission as specified in claims 1 through 3, characterized in that said torque-reduction amount computing means include means having a plurality of set gear ratios immediately before completion of shifting and for changing the absolute value of said torque-reduction amount set gain to be smaller as shifting progresses.

With this system for controlling a torque reduction at shifting for an automatic transmission, it includes a plurality of set gear ratios immediately before completion of shifting and changes the absolute value of said gain to be smaller as shifting progresses, allowing smooth completion of torque-reduction control. Moreover, the absolute value of the torque-reduction amount set gain is changed from a great value to a small value, allowing achievement of coincidence of the shifting completion timing and the torque-reduction control completion timing while regaining torque quickly, resulting in prevention of a shift shock and the like due to torque reduction.

BRIEF DESCRIPTION OF THE DRAWINGS

FIGS. 9A–9C are time charts illustrating as comparative examples a case where completion of torque-reduction control is carried out at a predetermined gradient as previously set by regaining a torque-reduction amount when reaching a predetermined gear ratio GR, and a case where completion of torque-reduction control is carried out by arranging change points of a torque-reduction amount set gain;

BEST MODE FOR CARRYING OUT THE INVENTION

Using the drawings, a description is made hereafter about the embodiment of the present invention.

(Embodiment)

Figure 1:
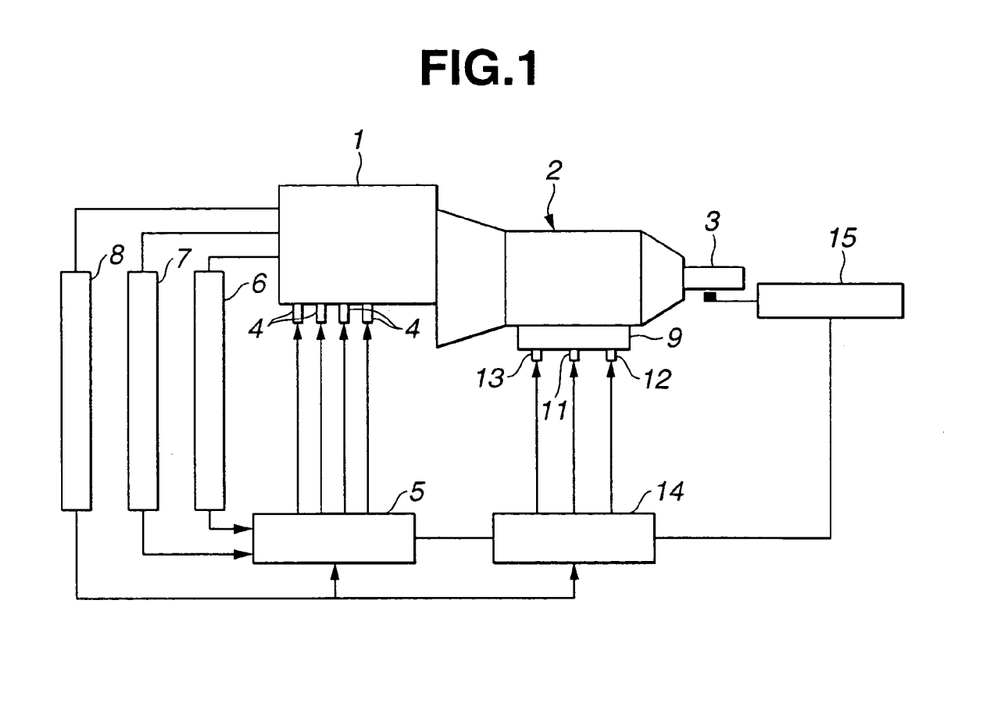
FIG. 1 is a general block diagram illustrating a system for controlling a torque reduction at shifting for an automatic transmission in an embodiment.

FIG. 1 is a system drawing showing a system for controlling a torque reduction in the embodiment, wherein 1 designates an engine as a prime mover, and 2 designates an automatic transmission. Output torque of the engine 1 is input to the automatic transmission 2, which transmits to an output shaft 3 output torque at a gear ratio in accordance with the selected speed so as to run the vehicle.

The engine 1 includes a plurality of injectors 4 for injecting fuel, wherein fuel injection of each injector 4 is carried out by an engine control unit 5. The engine control unit 5 is constructed to input essentially a signal out of an engine-speed sensor 6 for sensing an engine speed Ne, a signal out of a coolant-temperature sensor 7 for sensing the engine-coolant temperature, and a signal out of a throttle-opening sensor 8 for sensing a throttle opening TVO corresponding to an engine load so as to compute a fuel injection amount, then operate individually the injectors 4 by timing engine rotation by a time corresponding thereto, wherein operation of ones of the injectors 4 for carrying out fuel injection into some cylinders can be stopped as required to reduce output torque.

Specifically, the injectors 4 and the engine control unit 5 correspond to torque changing means described in claims. As for the torque changing means, torque-reduction control may be carried out through retard for changing an ignition timing or electronic throttle control for changing the throttle opening by using the electronic throttle opening.

Figure 2:
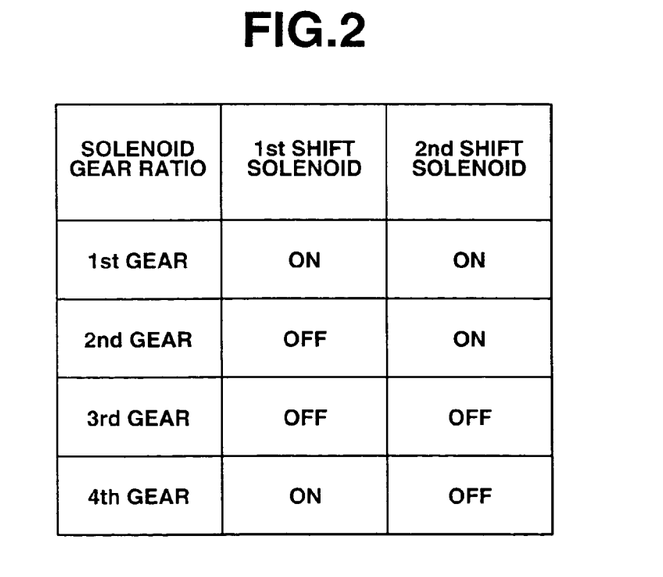
FIG. 2 is a view illustrating an ON-OFF combination of solenoids in the automatic transmission in the embodiment.

The automatic transmission 2 includes a control valve 9 for controlling shifting by supplying the hydraulic pressure or stopping the supply to actuators for engaging or releasing friction elements, not shown. The control valve 9 has therein a first shift solenoid 11, a second shift solenoid 12, and a line-pressure solenoid 13. The shift solenoids 11, 12 are of a well-known structure that various friction elements are operated by an ON-OFF combination as shown in FIG. 2 to form each gear. At this time, it is used a line pressure formed by duty controlling the line-pressure solenoid 13.

Operation of the above-mentioned shift solenoids 11, 12 and line-pressure solenoid 13 is carried out by a shift control unit 14. As is well known, the shift control unit 14 determines essentially an optimum gear on the basis of the throttle opening TVO obtained from the throttle-opening sensor 8 and the vehicle speed obtained from the vehicle-speed sensor 15 which is constructed to sense the number of revolutions of the output shaft 3, carrying out ON-OFF switching of the shift solenoids 11, 12.

Moreover, at shifting, the shift control unit 14 outputs a signal for torque-reduction operation to the engine control unit 5 so as to enhance the shift quality and the endurance reliability of a friction material for shifting.

Figure 3:
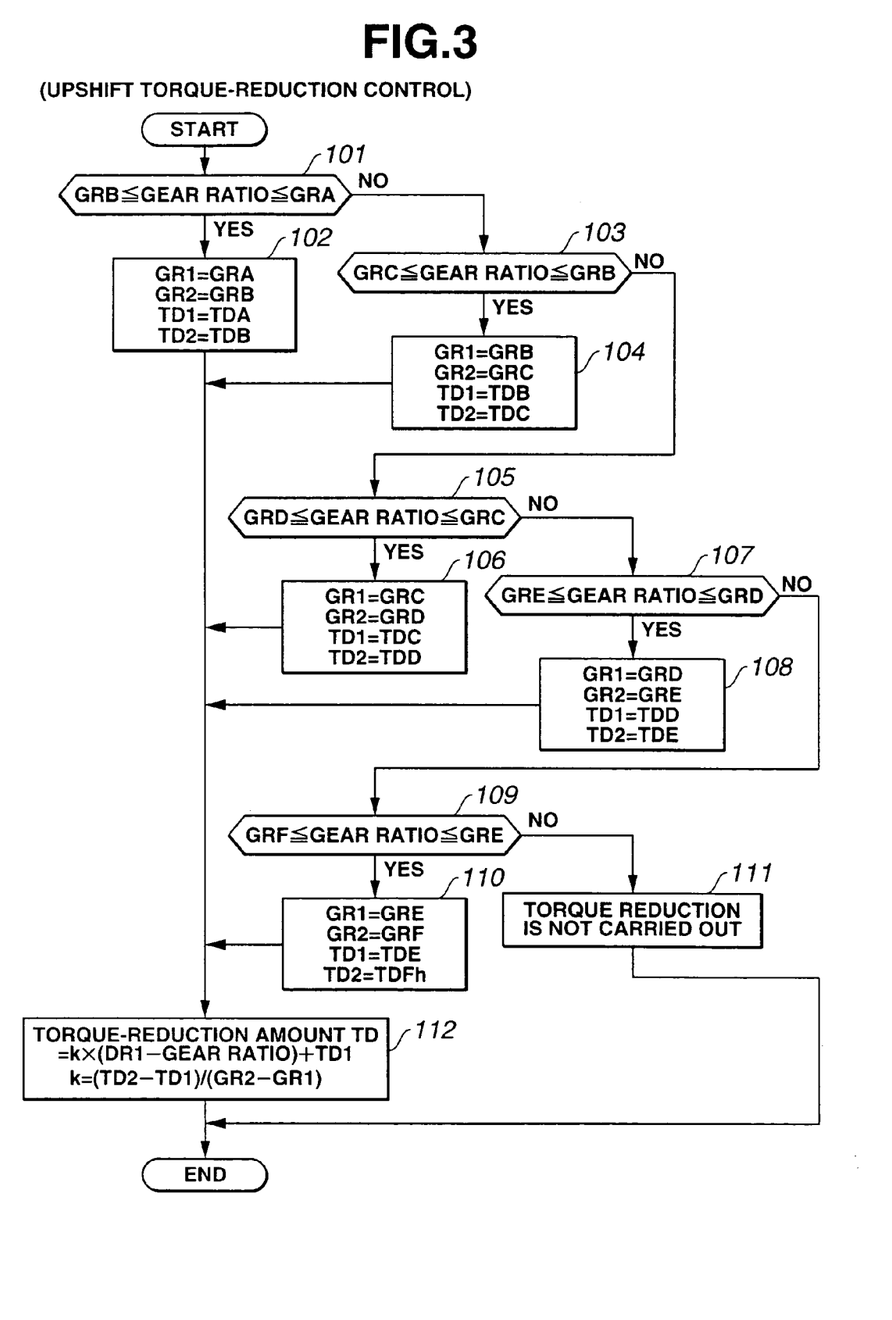
FIG. 3 is a flow chart illustrating torque-reduction control at upshifting in the automatic transmission in the embodiment.

FIG. 3 is a flow chart illustrating torque-reduction control at upshifting. At a step 101, it is determined whether or not an actual gear ratio is within the range of a second set gear ratio GRB indicating that the inertia phase progresses over a predetermined amount or more and a first set gear ratio GRA indicating immediately after start of the inertia phase or less. If it is within the set range, flow proceeds to a step 102. Otherwise, flow proceeds to a step 103.

At the step 102, values used in a computing equation for a torque-reduction amount are set (GR1=GRA, GR2=GRB, TD1=TDA, and TD2=TDB). At the step 103, it is determined whether or not the actual gear ratio is within the range of a third set gear ratio GRC indicating that the inertia phase further progresses over a predetermined amount and the second set gear ratio GRB or less. If it is within the set range, flow proceeds to a step 104. Otherwise, flow proceeds to a step 105.

At the step 104, values used in a computing equation for a torque-reduction amount are set (GR1=GRB, GR2=GRC, TD1=TDB, and TD2=TDC). At the step 105, it is determined whether or not the actual gear ratio is within the range of a fourth set gear ratio GRD indicating that the inertia phase further progresses over a predetermined amount and the third set gear ratio GRC or less. If it is within the set range, flow proceeds to a step 106. Otherwise, flow proceeds to a step 107.

At the step 106, values used in a computing equation for a torque-reduction amount are set (GR1=GRC, GR2=GRD, TD1=TDC, and TD2=TDD). At the step 107, it is determined whether or not the actual gear ratio is within the range of a fifth set gear ratio GRE indicating that the inertia phase further progresses over a predetermined amount and the fourth set gear ratio GRD or less. If it is within the set range, flow proceeds to a step 108. Otherwise, flow proceeds to a step 109.

At the step 108, values used in a computing equation for a torque-reduction amount are set (GR1=GRD, GR2=GRE, TD1=TDD, and TD2=TDE). At the step 109, it is determined whether or not the actual gear ratio is within the range of a sixth set gear ratio GRF indicating that the inertia phase further progresses over a predetermined amount and the fifth set gear ratio GRE or less. If it is within the set range, flow proceeds to a step 110. Otherwise, flow proceeds to a step 111.

At the step 110, values used in a computing equation for a torque-reduction amount are set (GR1=GRE, GR2=GRF, TD1=TDE, and TD2=TDF). At the step 111, the present control is finished without carrying out torque-reduction control.

At a step 112, a torque-reduction amount is computed in accordance with the following equation:

$$TD = k(\text{actual gear ratio} - GR1) + TD1$$

where k is a torque-reduction amount set gain which is a rate of change of a torque-reduction amount with respect to a change in gear ratio, and it is calculated in accordance with the following equation:

$$k = (TD2 - TD1)/(GR2 - GR1)$$

When an upshift command is output from the shift control unit 14, the actual gear ratio is calculated out of the engine speed and the vehicle speed, which is compared with set gear ratios to determine a torque-reduction amount.

Figure 4:
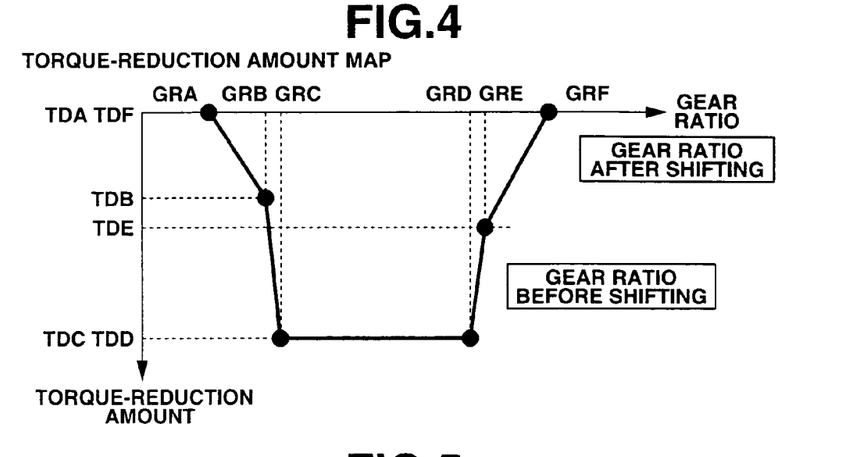
FIG. 4 is a view illustrating a map of torque-reduction amount of the automatic transmission in the embodiment.

FIG. 4 illustrates a map of torque-reduction amount showing the relationship between a torque-reduction amount and a gear ratio. This torque-reduction amount map is provided for each type of shifting, i.e. 1-3 shifting, 2-3 shifting, 3-4 shifting or the like, for example, to allow calculation of an optimum torque-reduction amount in accordance with each shifting.

Figure 5:
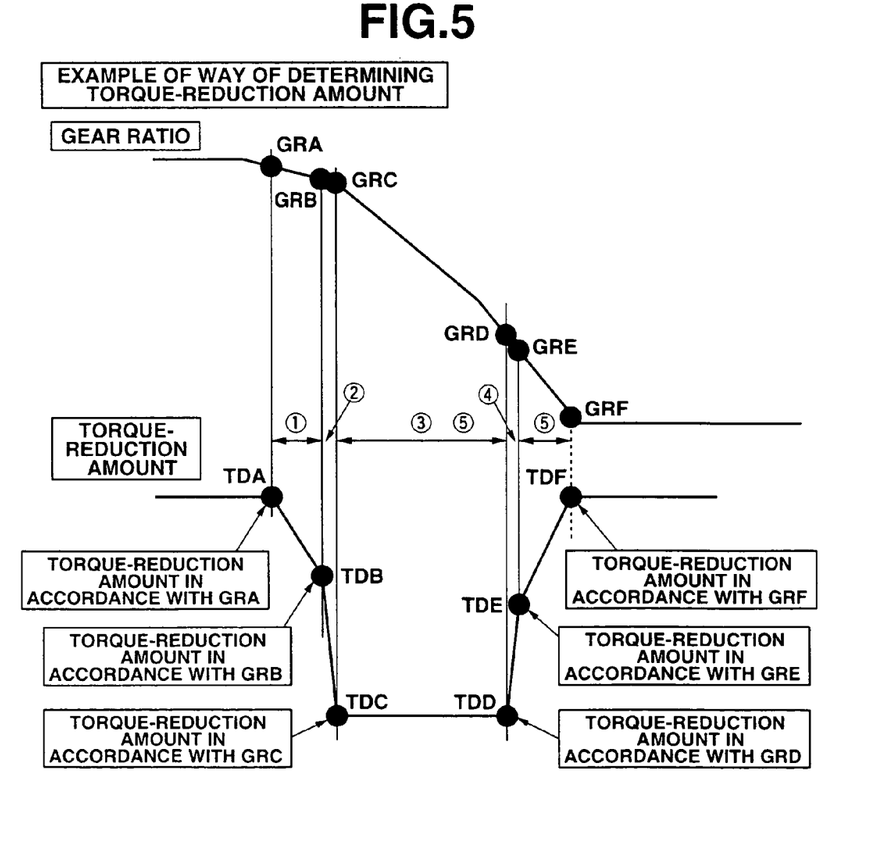
FIG. 5 is a time chart of a gear ratio and a torque-reduction amount at upshifting of the automatic transmission in the embodiment.

FIG. 5 is a time chart for setting a torque-reduction amount in accordance with a change in gear ratio and on the basis of the torque-reduction amount map as shown in FIG. 4.

When shifting starts after output of a shift command, and enters the inertia phase so that a gear ratio starts changing actually, and when an actual gear ratio is between the first set gear ratio GRA and the second set gear ratio GRB (area ① in the drawing), k is set at (TDB−TDA)/(GRB−GRA), and TD is set as follows:

$$\text{torque-reduction amount } TD = k(\text{actual gear ratio} - GRA) + TDA$$

Likewise, when an actual gear ratio is between GRB and GRC (area ② in the drawing), k is set at (TDC−TDB)/(GRC−GRB), and TD is set as follows:

$$\text{torque-reduction amount } TD = k(\text{actual gear ratio} - GRB) + TDB$$

And an actual gear ratio reaches the fourth set gear ratio GRD after reaching the third set gear ratio GRC (area ③ in the drawing), a torque-reduction amount is set at TDC.

In the neighborhood of completion of shifting, when an actual gear ratio is between GRD and GRE (area ④ in the drawing), k is set at (TDE−TDD)/(GRE−GRD), and TD is set as follows:

$$\text{torque-reduction amount } TD = k(\text{actual gear ratio} - GRD) + TDD$$

Likewise, when an actual gear ratio is between GRE and GRF (area ⑤ in the drawing), k is set at (TDF−TDE)/(GRF−GRE), and TD is set as follows:

$$\text{torque-reduction amount } TD = k(\text{actual gear ratio} - GRE) + TDE$$

Specifically, the gear ratios GRA, GRB, GRC, GRD, GRE, GRF are set as a changing point of a torque-reduction amount set gain to carry out control such that at start of torque-reduction control, torque is reduced gradually, whereas at completion of torque-reduction control, torque is regained gradually.

FIGS. 6A–8B are time charts illustrating a vehicle-body acceleration G, gear ratio, torque-reduction amount TD when torque-reduction control in the embodiment is applied and when torque-reduction control in a comparative example is applied.

Here, the contents of control in the comparative example are described.

FIG. 10 is a flow chart illustrating torque-reduction control in the comparative example.

When a shift command is output, at a step 201, torque-reduction control is started. At a step 202, engine torque is sustained as is, and then, at a step 203, it is determined whether or not a predetermined time T1 has elapsed. After a lapse of the predetermined time T1, at a step 204, engine torque is reduced gradually, and at a step 205, it is determined whether or not an actual gear ratio is equal to or smaller than the first set gear ratio G1. If the actual gear ratio is equal to or smaller than the first set gear ratio G1, at a step 206, engine torque is reduced up to a predetermined amount at a stroke. And at a step 207, when the actual gear ratio is equal to the third set gear ratio G3, engine torque is regained at a stroke, achieving shortened shift time (refer to a time chart of an actual gear ratio and a torque-reduction amount in FIG. 11).

Figure 6A:
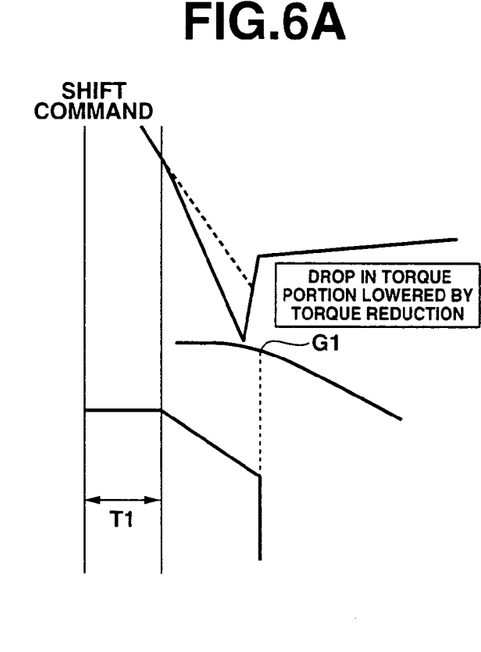
FIGS. 6A and 6B are time charts for comparing a case where a start timing of torque reduction is too advanced in a comparative example with torque-reduction control in the embodiment.
Figure 6B:
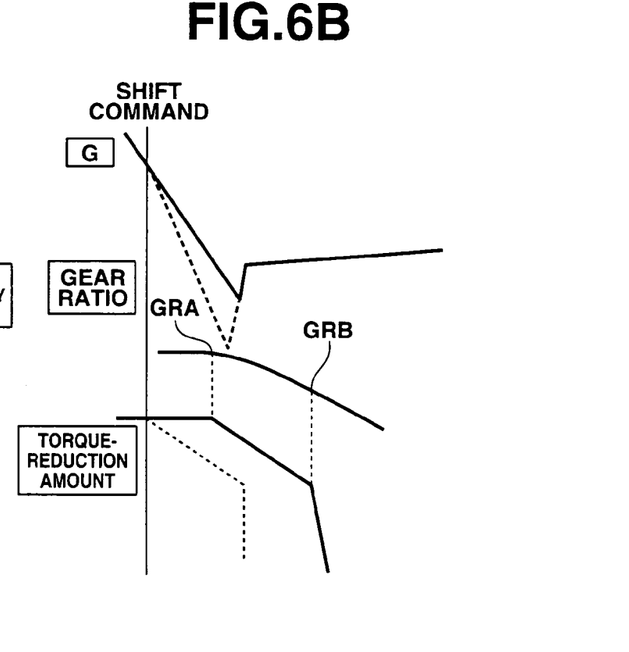

FIGS. 6A and 6B show time charts for comparison with a case where a start timing of torque reduction is too advanced in the comparative example.

As shown in FIG. 6A, after a lapse of the predetermined time T1 from output of a shift command, a torque reduction is started. If a start timing is too advanced, the state occurs that acceleration of a torque portion lowered by a torque reduction is too reduced (refer hereafter to as drop). Here, by starting a torque reduction when reaching the first set gear ratio GRA immediately after start of the inertia phase as in the embodiment in FIG. 6B without carrying out a torque reduction up to that time, stable shift control can be achieved with no drop due to torque reduction.

Figure 7A:
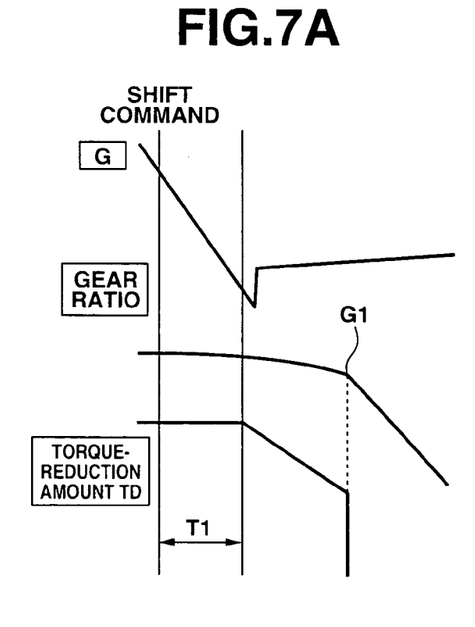
FIGS. 7A and 7B are time charts for comparing a case where a start timing of torque reduction is too delayed in a comparative example with torque-reduction control in the embodiment.
Figure 7B:
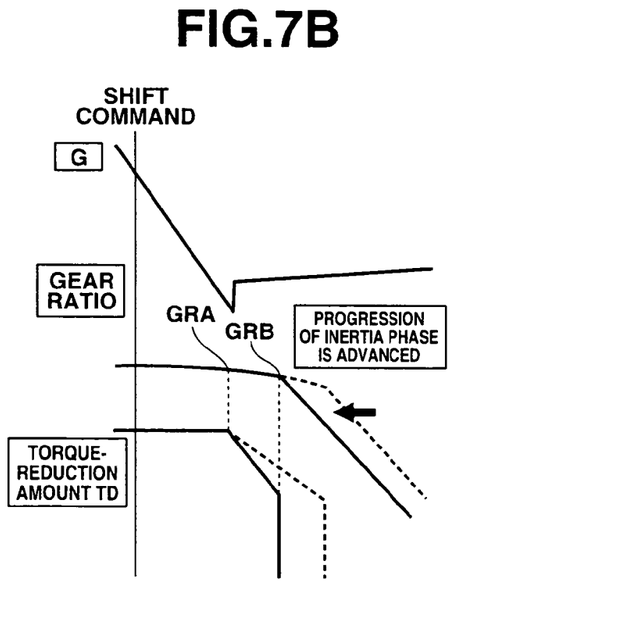

FIGS. 7A and 7B are time charts for comparing a case where a start timing of torque reduction is too delayed in the comparative example with the present embodiment.

As shown in FIG. 7A, after a lapse of the predetermined time T1 from output of a shift command, a torque reduction is started. If a start timing is too delayed, progression of the inertia phase is delayed to elongate shifting. Here, by starting a torque reduction when reaching the first set gear ratio GRA as in the embodiment in FIG. 7B, quick progression of the inertia phase can be achieved.

Figure 8A:
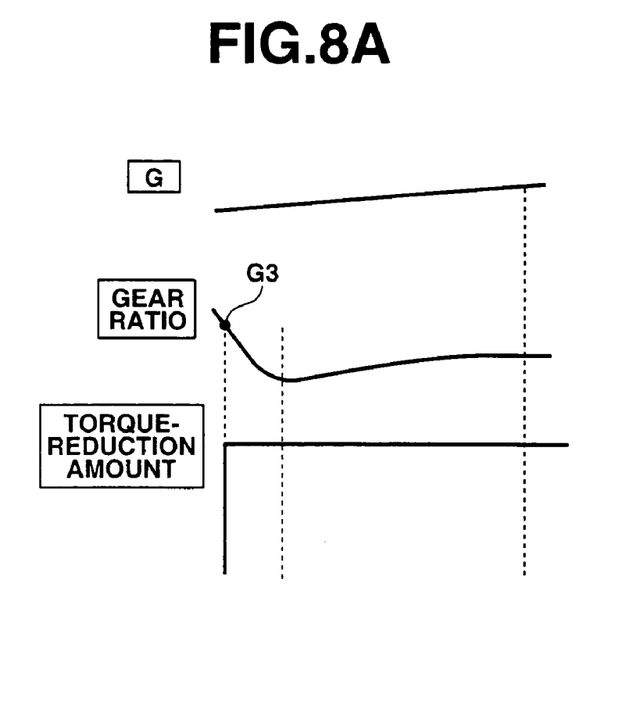
FIGS. 8A and 8B are time charts for comparing a case where a completion timing of torque reduction is too advanced in a comparative example with torque-reduction control in the embodiment.
Figure 8B:
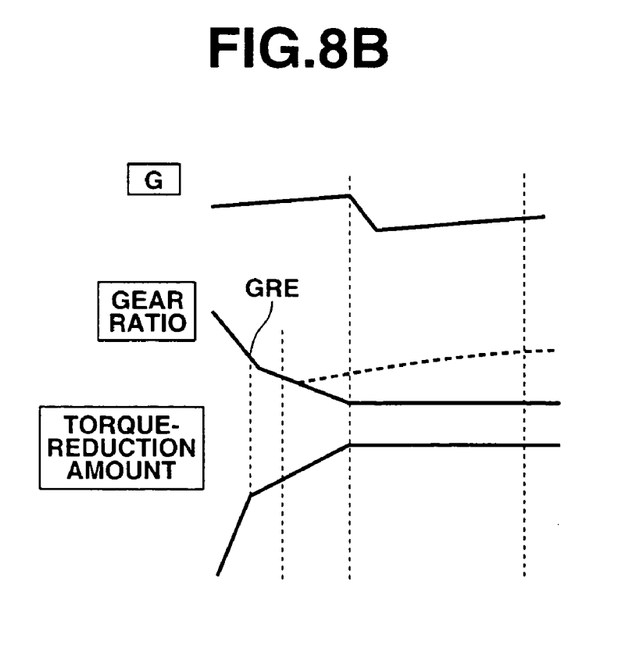

FIGS. 8A and 8B are time charts for comparison with a case where a completion timing of torque reduction is too advanced in the comparative example.

As shown in FIG. 8A, when the actual gear ratio reaches the third set gear ratio G3, a torque-reduction amount is regained at a stroke. If a torque reduction is completed at a stroke before completion of the inertia phase, progression of the inertia phase is delayed to elongate or turn back shifting, leading to impossible completion of the inertial phase. Here, by regaining a torque reduction in accordance with a set gear ratio as in the embodiment in FIG. 8B, completion of shifting and that of torque-reduction control are achieved at the same time, allowing achievement of stable control.

Figure 9A:
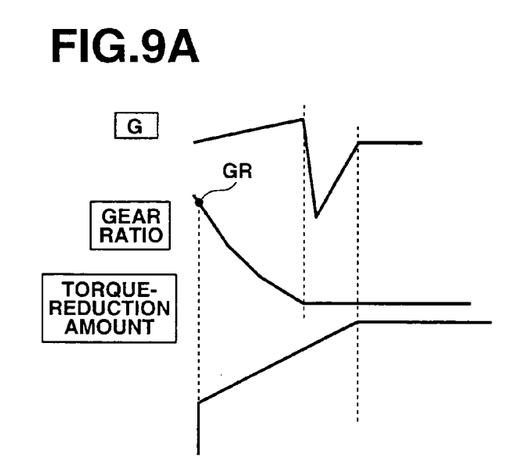
Figure 9B:
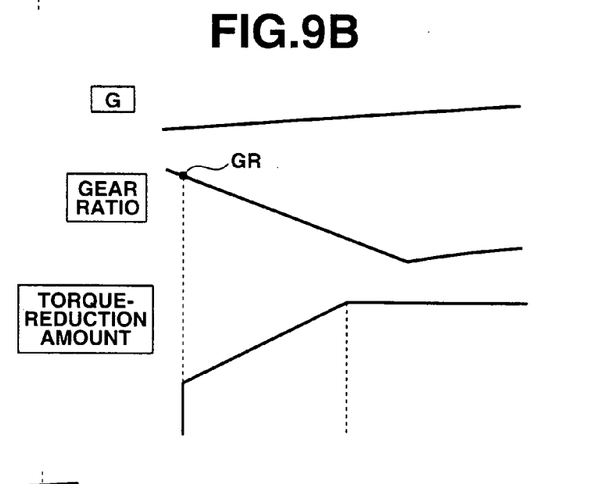
Figure 9C:
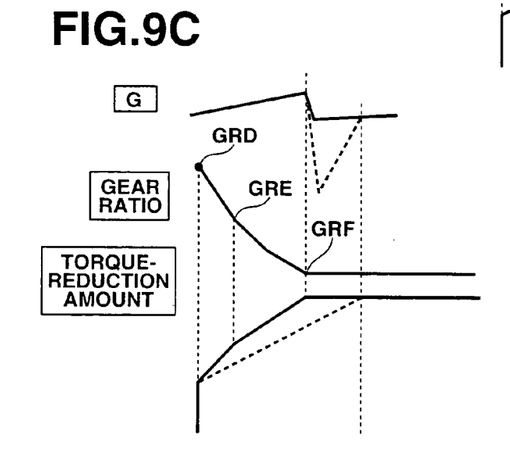

FIGS. 9A–9C are time charts illustrating as comparative examples a case where completion of torque-reduction control is carried out at a predetermined gradient as previously set by regaining a torque-reduction amount when reaching a predetermined gear ratio GR, and a case where completion of torque-reduction control is carried out by arranging change points of a torque-reduction amount set gain.

Even if a torque-reduction amount is changed at a predetermined gradient when reaching a certain set gear ratio GR to regain torque gradually, it is difficult to make completion of the inertia phase coincide with that of torque reduction due to variation and secular change in the friction elements, etc., leading to completion of torque reduction delayed or advanced with respect to that of the inertia phase. By way of example, when completion of torque reduction is delayed, a torque reduction is also carried out after completion of the inertia phase as shown in FIG. 9A, thus producing drop in a torque-reduction portion. When completion of torque reduction is advanced, shifting is elongated as shown in FIG. 9B. Here, as in the embodiment in FIG. 9C, since the torque-reduction amount set gain k is changed at points of GRD, GRE, GRF to make a torque-reduction amount follow the state of change of a gear ratio, the completion timings of the inertia phase and torque-reduction control surely coincide with each other, allowing achievement of stable control without any occurrence of drop. Moreover, since k is set to be smooth as it reaches a completion point of torque-reduction control, coincidence of the completion timings of the inertia phase and torque-reduction control can be achieved with completion of torque-reduction control achieved quickly.

As described above, with the system for controlling a torque reduction at shifting for an automatic transmission in the present embodiment, even if a gradient of change of an actual gear ratio varies, a torque-reduction amount follows a change in the actual gear ratio, so that a torque-reduction amount can be set appropriately, resulting in appropriate control of the start and completion timings of torque-reduction control. With this, stable torque-reduction control is possible to prevent elongation of shifting, allowing enhancement in the shift quality and in the endurance reliability of a friction material for shifting. A shock and the like due to torque reduction can be prevented.

Further, there arrange a plurality of change points of a rate of change of the torque-reduction amount set gain with respect to a change in gear ratio, more stable torque-reduction control is possible to achieve further prevention of a shock and the like due to torque reduction.

Still further, at the initial stage of the inertia phase, it is possible not only to start torque-reduction control smoothly, but also to secure a torque-reduction amount quickly due to an absolute value of the torque-reduction amount set gain being greater.

Furthermore, at completion of the inertia phase, the absolute value of the torque-reduction amount set gain is changed from a great value to a small value, allowing achievement of coincidence of the shifting completion timing and the torque-reduction control completion timing while regaining torque quickly, resulting in prevention of a shift shock and the like due to torque reduction.

(Other Embodiments)

In the present embodiment, an example is shown wherein there arrange set gear ratios (change points of the torque-reduction amount set gain) GRA, GRB, GRC at start of torque-reduction control, and GRD, GRE, GRF at completion of torque-reduction control. It is not limitative, and further set gear ratios may be arranged.

Moreover, in the present embodiment, the torque-reduction amount set gain is previously set in an area of each gear ratio. Alternatively, it may be changed continuously with respect to a gear ratio.

What is claimed is:

1. A system for controlling a torque reduction at shifting for an automatic transmission, the system comprising:
   torque changing means for changing an output torque of a prime mover;
   shift-state detecting means for detecting a shift state of the automatic transmission shift-controlled by shift control means in accordance with running conditions including a driving state; and
   torque-reduction control means for reducing, when detecting start of an upshifting by said shift-state detecting means, the output torque by said torque changing means during a period from this detection to completion of the upshifting, characterized in that
   there arrange actual gear-ratio detecting means for detecting an actual gear ratio out of input rotation and output rotation of the automatic transmission, and torque-reduction amount computing means for calculating a torque-reduction amount out of a torque-reduction set gain set previously, which is a rate of change of the torque-reduction amount with respect to a change in gear ratio, and the detected actual gear ratio.

2. The system for controlling a torque reduction at shifting for an automatic transmission as specified in claim 1, characterized in that said torque-reduction amount computing means include means having a plurality of set gear ratios and for changing the torque-reduction amount set gain by the detected actual gear ratio reaches the set gear ratio.

3. The system for controlling a torque reduction at shifting for an automatic transmission as specified in claim 1, characterized in that
   said torque-reduction amount computing means include means having a plurality of set gear ratios corresponding to immediately after start of shifting and for changing an absolute value of said torque-reduction amount set gain to be greater as shifting progresses and putting said torque-reduction amount set gain to zero when said actual gear ratio reaches the set gear ratio of zero gain to maintain the torque-reduction amount constant.

4. The system for controlling a torque reduction at shifting for an automatic transmission as specified in claim 1, characterized in that
   said torque-reduction amount computing means include means having a plurality of set gear ratios corresponding to immediately before completion of shifting and for changing the absolute value of said torque-reduction amount set gain to be smaller as shifting progresses.

5. The system for controlling a torque reduction at shifting for an automatic transmission as specified in claim 2, characterized in that said torque-reduction amount computing means include means having a plurality of set gear ratios corresponding to immediately after start of shifting and for changing an absolute value of said torque-reduction amount set gain to be greater as shifting progresses and putting said torque-reduction amount set gain to zero when said actual gear ratio reaches the set gear ratio of zero gain to maintain the torque-reduction amount constant.

6. The system for controlling a torque reduction at shifting for an automatic transmission as specified in claim 2, characterized in that said torque-reduction amount computing means include means having a plurality of set gear ratios corresponding to immediately before completion of shifting and for changing the absolute value of said torque-reduction amount set gain to be smaller as shifting progresses.

7. The system for controlling a torque reduction at shifting for an automatic transmission as specified in claim 3, characterized in that said torque-reduction amount computing means include means having a plurality of set gear ratios corresponding to immediately before completion of shifting and for changing the absolute value of said torque-reduction amount set gain to be smaller as shifting progresses.

* * * * *